| United States Patent [19] | [11] | 4,011,380 |
|---|---|---|
| West et al. | [45] | Mar. 8, 1977 |

[54] OXIDATION OF POLYMERS IN PRESENCE OF BENZENE SULFONIC ACID OR SALT THEREOF

[75] Inventors: Charles T. West, Naperville; George S. Culbertson, Downers Grove, both of Ill.

[73] Assignee: Standard Oil Company (Indiana), Chicago, Ill.

[22] Filed: Dec. 5, 1975

[21] Appl. No.: 637,886

[52] U.S. Cl. .................. 526/30; 252/33.4; 252/51.5 R; 252/55; 260/29.6 MQ; 260/29.6 XA; 260/878 R
[51] Int. Cl.$^2$ ............... C08F 8/06; C08F 8/32
[58] Field of Search ............ 526/30; 260/29.6 XA, 260/29.6 MQ, 878 R; 252/33.4, 55, 51.5 R

[56] References Cited

UNITED STATES PATENTS

| 3,046,260 | 7/1962 | Stewart et al. ............... 526/30 |
| 3,864,268 | 2/1975 | Culbertson et al. .......... 252/51.5 R |

*Primary Examiner*—William F. Hamrock
*Attorney, Agent, or Firm*—Frank J. Sroka; Arthur G. Gilkes; William T. McClain

[57] ABSTRACT

This invention provides a process for the oxidation of copolymers of ethylene and olefinic monomers in the temperature range of from about −40° F to about 800° F. The oxidation is carried out in the presence of about 0.05 weight percent to about 1.0 weight percent based on copolymer/oil solution, of an oil soluble benzene sulfonic acid or salt thereof. These benzene sulfonic acids or salts thereof affect the rate of the oxidation reaction and/or the color of the oxidized product or amine reaction products thereof.

21 Claims, No Drawings

OXIDATION OF POLYMERS IN PRESENCE OF BENZENE SULFONIC ACID OR SALT THEREOF

BACKGROUND OF THE INVENTION

Oxidized polymers have found a number of applications, one of which is as an intermediate for lubricating oil additives.

Lubricant deterioration in high speed engines causes the formation of lacquer, sludge and carbon deposits on the interior surfaces of the engines which accelerates wear and reduces engine efficiency. To reduce the tendency for such deleterious products to deposit on the surfaces of the engine it is known to incorporate in the lubricating oil additives having dispersancy and/or detergency properties.

The continuing search for and the necessity of having available ashless dispersants and/or detergents additives for motor oils is well known. Since the development of the positive crankcase ventilation system (PCV) there is a greater demand than ever for improved additives of such types.

It is also well known that lubricating oils have a tendency to become thin at elevated temperatures while becoming thick at low temperatures, and thus it is generally necessary to add additives to such lubricants which improve their viscosity-temperature relationships. For example, in the case of a crankcase lubricating oil in a cold engine, it is desirable that the oil not become so thick that it is difficult to start the engine; while, when the engine is hot it is necessary that the oil remains sufficiently viscous that an oil film is maintained between the moving parts.

Various products have been developed for the purpose of providing the dispersant and/or detergent function.

Culbertson, et. al., U.S. Pat. No. 3,544,520 issued Dec. 1, 1970, discloses and claims as ashless dispersants the products prepared by subjecting an olefin polymer having a molecular weight of about 200–2,000; such as a polybutene or polypropylene to oxidation in the presence of a catalyst such as manganous carbonate, and the oxidized polymer then condensed with formaldehyde and a polyalkylene polyamine. Such condensation products while effective as ashless dispersants, do not impart V. I. improving properties to lubricating oils.

Additives, imparting sludge inhibiting and detergent properties to lubricating oils, prepared by reacting oxidized degraded interpolymers of propylene and ethylene having a molecular weight of at least about 1,000, with maleic anhydride, and neutralizing the acidic intermediate with an alkylene polyamine, is described in U.S. Pat. No. 3,316,177.

Culbertson, et. al., U.S. Pat. No. 3,872,019 issued Mar. 18, 1975 discloses and claims bi-functional lubricant additives exhibiting dispersant and V.I. improving properties obtained by the Mannich Condensation of an oxidized long-chain high molecular weight amorphous copolymer of essentially ethylene and propylene having a number average molecular weight of at least about 10,000 and at least 140 pendant methyl groups per 1,000 chain carbon atoms, with a formaldehyde yielding reactant and a primary or secondary amine or polyamine, said reactants being employed in the molar ratio of from about 1:2:2 to about 1:20:20, respectively.

Others have also made lubricating oil additives by oxidizing various copolymers.

It has been noted that during the oxidation of the copolymer, the product sometimes becomes undesirably dark colored. Dark colored oxidized intermediates generally lead to dark colored derivatives. Also, reaction time for the oxidation is relatively long and reactor throughput is less than desired. In some cases it is desirable to produce a product having lighter color. In many cases, it is desirable to increase the rate of oxidation so as to increase reactor throughput, even without maintaining product color. It is an object of this invention to provide a process for oxidizing copolymers while controlling reaction rate and/or product color.

SUMMARY OF THE INVENTION

In accordance with this invention, copolymers of ethylene and olefinic monomers are oxidized in the temperature range of from about −40° F. to about 800° F. in the presence of about 0.01 weight percent to about 5.0 weight percent or higher based on copolymer/oil solution, of an oil soluble benzene sulfonic acid or salt thereof. Preferably the oxidation is conducted in the presence of about 0.10 weight percent to about 1.0 weight percent based on copolymer of said benzene sulfonic acid or salt thereof. These benzene sulfonic acids and salts thereof affect the rate of the oxidation reaction and/or the color of the oxidized product or amine reaction products thereof. Because these additional agents are themselves recognized as lubricating oil additives, they generally need not be removed from the oxidation reaction product when said product is an intermediate for lubricating oil addition agents.

THE COPOLYMER

The term "copolymer" as used herein and in the appended claims, refers to amorphous copolymers derived from ethylene and olefinically unsaturated monomers. Such olefin monomers include olefins of the general formula $RCH=CH_2$, in which R is an aliphatic or cycloaliphatic radical of from 1 to about 20 carbon atoms, for example, propene, iso-butylene, butene-1, hexene-1, 4-methyl-1-pentene, and decene-1. Other olefin monomers having a plurality of double bonds may be used, in particular di-olefins containing from about 4 to about 25 carbon atoms, e.g., 1,4-butadiene, 1,3-hexadiene, 1,4-pentadiene, 2-methyl-1,5-hexadiene, 1,7-octadiene, vinyl norbornene, 5-methylene-2-norbornene, etc.

Suitable ethylene-propylene copolymers contain about 30 to about 65, preferably from about 35 to about 45 mole percent propylene, have a number average molecular weight of at least about 20,000, i.e., from about 20,000 to about 200,000 or more, and preferably from about 20,000 to about 70,000 and contain at least 150 pendant methyl groups per 1,000 chain carbon atoms.

A particularly suitable ethylene-propylene coplymer is one having the following characteristics:

| | |
|---|---|
| Number Average Molecular Weight | 25,000–35,000 |
| Percent (Molar) Propylene Monomer | 38–42 |
| Pendant Methyl Groups per 1,000 Chain Carbon Atoms | 160–170 |

-continued

| | | |
|---|---|---|
| Inherent Viscosity | 1.7–2.0 | (A) |
| Gardner Viscosity | U–V | (B) |
| Mooney Viscosity | 20–35 | (C) |

(A) 0.1 gram copolymer in 100 cc decalin at 135° C.
(B) 8.0% copolymer in toluene at 25° C.
(C) ASTM D-1646

Methods of preparation of the copolymers are well known; such methods are described in many U.S. patents, such as, among others, U.S. Pat. Nos. 2,700,633; 2,725,231; 2,792,288; 2,933,480; 3,000,866; 3,063,973; 3,093,621 and others.

OXIDATION OF THE COPOLYMER

The oxidation can be accomplished by contacting the copolymer under suitable conditions of temperature and at atmospheric or elevated pressures, with an oxidizing agent such as air or free oxygen, or any oxygen-containing material capable of releasing oxygen under the oxidation conditions. If desired, the oxidation can be conducted in the presence of known oxidation catalysts, such as platinum or a platinum group metal, and compounds containing metals such as copper, iron, cobalt, cadmium, manganese, vanadium, etc. The oxidation can be carried out by methods described in U.S. Pat. Nos. 2,982,728; 3,316,177; 3,153,025; 3,365,499; and 3,544,520.

Generally, the oxidation can be carried out over a wide temperature range, depending upon the oxidizing agent used; for example, with an active oxidizing agent, e.g., $SO_3$, temperatures in the range of $-40°$ F. to $400°$ F. have been used, while with less active oxidizing agents, e.g., air, temperatures in the range of $100°-800°$ F. have been used. The copolymers are generally dissolved in oil prior to the oxidation. Further, depending upon the rate desired, the oxidation can be conducted at sub-atmospheric, atmospheric or super-atmospheric pressures, and in the presence or absence of oxidation catalysts. The conditions of temperature, pressure, oxygen content of the oxidizing agent, the rate of introducing the oxidizing agent, the catalyst employed, if any, etc., are correlated and controlled, by those skilled in the art, so as to obtain the desired optimum results.

The following will illustrate one method of oxidizing the copolymer; to a copolymer of ethylene and propylene (1 part), having a number average molecular weight of about 28,000, was added a solvent-extracted SAE 5W mineral oil (9 parts) in an open reaction vessel, and the mixture slowly stirred and heated at a temperature of 360° F., under an inert gas atmosphere, until the solution of the rubber-like polymer in the solvent was affected. Maintaining the 360° F. temperature, the mixture was rapidly agitated in an atmosphere compoosed of 50 percent air and 50 percent nitrogen, to promote the oxidation of the copolymer. A 50:50 air-nitrogen ratio was used to preclude the possibility of an explosive mixture being formed. Reaction in the described manner was continued for 2.5–4.0 hours. About 5–50 oxygen atoms per molecule of the copolymer were introduced under such oxidation conditions.

BENZENE SULFONIC ACID OR SALT THEREOF

The copolymer oxidation is carried out in the presence of about 0.01 weight percent to about 5.0 weight percent, preferably about 0.10 weight percent to about 2.0 weight percent based on copolymer of benzene sulfonic acid or salt thereof. As can be seen below, a wide variety of such benzene sulfonic acids or salts operate to inhibit color formation during the oxidation or modify the oxidation rate, or both.

Some of the above compounds have the general formula

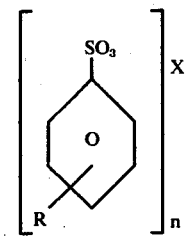

where R is hydrogen, alkyl or hydroxy, chloro or bromo hydrocarbyl; X is hydrogen, magensium calcium, sodium, or an amine; and $n$ is an integer of 1–2. In some cases the R group can be made by polymerizing $C_2$–$C_6$ olefins to a molecular weight in the range of about 80 to about 100,000 preferably about 80 to about 1,000, and then attaching said group to a benzene ring by well known alkylation techniques. X can be most any amine which will form a salt with benzene sulfonic acid and form an oil-soluble compound. Suitable amines are the various mono amines such as long chain fatty amines, diamines such as the diamine series, ethylene polyamines such as tetraethylene pentamine, and others. The amine may also contain substituents such as chlorine, bromine, or hydroxy groups.

R can be most any hydrocarbon or substituted hydrocarbon which results in an oil soluble benzene sulfonic acid or salt thereof. R can be a low molecular weight alkyl such as iso-butyl, nonyl, and the like; an intermediate molecular weight hydrocarbyl such as $C_{15}$–$C_{100}$ polybutylene or polypropylene polymers; a high molecular weight hydrocarbyl such as polyolefin having a number average molecular weight of 100,000; and others. R can be substituted with groups such as chlorine, bromine or hydroxy groups. Also, the benzene ring of the sulfonic acid may have more than one substituent alkyl or hydroxy or halo alkyl groups.

Suitable oil-soluble benzene sulfonic acids are the oil-soluble petroleum sulfonic acids, commonly referred to as "mahogany acids," of about 350 to 750 molecular weight, aryl sulfonic acids, and alkaryl sulfonic acids. Illustrative of such sulfonic acids are dilauryl benzene sulfonic acid, lauryl cetyl benzene sulfonic acid, paraffin-substituted benzene sulfonic acids, polyolefin alkylated benzene sulfonic acids, such as polybutylene alkylated benzene sulfonic acids in which the polybutylene substituents have molecular weights of at least about 100, and preferably within the range of from about 100 to about 100,000, polypropylene alkylated benzene sulfonic acids in which the polypropylene substituents have a molecular weight of at least about 80 and preferably within the range of from about 80 to about 100,000. Examples of other suitable sulfonic acids are diparaffin wax-substituted phenol sulfonic acids, cetyl chlorobenzene sulfonic acids, cetyl-phenol disulfide sulfonic acids, cetyl-phenol monosulfide sulfonic acids, cetoxy capryl benzene sulfonic acids. Other suitable oil-soluble sulfonic acids are well described in the art, such as for example U.S. Pat. No. 2,616,604; U.S. Pat. No. 2,626,207; and U.S. Pat. No. 2,767,209, and others.

The salts of benzene sulfonic acids can be overbased sulfonates, such as those made by the processes described in U.S. Pat. Nos. 3,524,814 and 3,609,076. Further, the various sulfonic acids may be used in conjunction with as second component such as MgO, ethylene diamine, and the like.

A most important consideration in selecting an R group is that the final substituted compound be oil soluble.

In the above general chemical formula, when X is hydrogen, sodium or calcium the copolymer oxidation reaction will generally be promoted but product color will generally be darker. This process is desirable where light product color is not needed but increases in reaction throughput would lead to cost savings. When X is magnesium, the product color will generally be lighter and the oxidation rate will generally be promoted. This latter process would be desirable where both light product color and increased throughput are needed. A number of deviations from the above general rules have been noted and cannot be currently explained. But it is obvious from the enclosed data that the disclosed classes of compounds do have a effect on copolymer oxidation rates and product color.

The following additives were tested in the oxidation of various copolymers:

| Additive | Description |
|---|---|
| A | 418 TBN Overbased Magnesium Sulfonate |
| B | 373 TBN Overbased Magnesium Sulfonate |

-continued

| Additive | Description |
|---|---|
| C | 373 TBN Overbased Magnesium Sulfonate |
| D | 95% 400 TBN Overbased Magnesium Sulfonate |
|   | 5% Ethylene Diamine |
| E | 400 TBN Overbased Magnesium Sulfonate |
| F | 15 TBN Calcium sulfonate |
| G | 400 MW Magnesium alkylbenzene sulfonate |
| H | 650 MW Magnesium alkylbenzene sulfonate |
| I | 780 MW Magnesium alkylbenzene sulfonate |
| J | 780 MW Magnesium alkylbenzene sulfonic acid |
| K | 2:1 Molar J:MgO |
| L | 2:1 Molar J:ethylene diamine |
| M | 650 MW sodium alkylbenzene sulfonate |
| N | 650 MW calcium alkylbenzene sulfonate |

Oxidations were carried out on seven percent copolymer solutions containing a 95:5 mixture of an ethylene-propylene copolymer; ethylenepropylene-diene terpolymer in Sun HPO 100N. Sun HPO 100N is a Puerto Rican 100 N base stock. The stirred heated solution was sparged with 1600 cc/minute of air and 1800 cc/minute of nitrogen. Initial viscosities generally ranged from 13,000–16,000 SUS at 210° F. Viscosity decreases as the oxidation progresses. Log viscosity/time is directly proportioned to the reaction rate constant, infrared carbonyl absorbance at 1720 $cm^{-1}$, activity, molecular weight and molecular weight distribution. Activity is that portion retained on a silica gel chromatography column after eluting with a non-polar solvent such as pentane, hexane, heptane or branced alkyl derivatives thereof. After oxidation the products were aminated by methods familiar with those versed in the art (e.g., U.S. Pat. No. 3,872,019). Infrared absorbtion at 1720 $cm^{-1}$ was on neat copolymer/oil samples in 0.5mm sodium chloride infrared cells in the sample beam and unoxidized copolymer/oil samples in 0.5mm sodium chloride infrared cells in the reference beam of a double beam recording infrared spectrophotometer. Viscosities were determined by the standard kinematic method, ASTM D 445. Color was determined by ASTM D 1500.

| Example | Oxidation Temp (° F) | Additive | Additive Conc weight % | IR/C=O (1720 cm-1) A/0.5 mm | $\Delta$ log vis $\overline{\Delta t_1}$ (hrs$^{-1}$) | ASTM Color Oxidized Intermediate | ASTM Color Aminated Product | % Activity |
|---|---|---|---|---|---|---|---|---|
| 1 | 360 | None | — | 0.25 | 0.29 | 4.5 | 6.0 | 6.9 |
| 2 | 375 | None | — |  | 0.43 | 3.5 | 5.5 | 5.5 |
| 3 | 362 | A | 0.54 | 0.31 | 0.35 | 2.5 | 3.5 | 9.4 |
| 4 | 376 | B | 0.10 |  | 0.46 |  | 4.5 |  |
| 5 | 375 | C | 0.19 |  | 0.38 | 2 | 4.5 | 5.1 |
| 6 | 375 | C | 0.10 |  | 0.31 | 2 | 4.0 | 11.9 |
| 7 | 376 | C | 0.10 |  | 0.34 | 2 | 3.5 | 7.9 |
| 8 | 376 | C | 0.20 |  | 0.52 | 2 | 4.0 | 8.8 |
| 9 | 365 | B | 0.20 |  | 0.38 | 2 | 3.5 |  |
| 10 | 371 | B | 0.20 |  | 0.41 |  | 3.5 |  |
| 11 | 370 | B | 0.20 |  | 0.43 |  |  |  |
| 12 | 353 | B | 0.20 | 0.14 | 0.32 |  |  | 7.4 |
| 13 | 373 | B | 0.20 | 0.14 | 0.41 |  |  | 7.1 |
| 14 | 333 | B | 0.20 | 0.20 | 0.18 |  |  | 9.0 |
| 15 | 352 | B | 0.20 | 0.17 | 0.33 |  |  | 9.1 |
| 16 | 360 | D | 0.56 | 0.32 | 0.19 |  | 4.5 | 11.1 |
| 17 | 364 | E | 0.58 |  | 0.24 |  | 4.5 |  |
| 18 | 376 | E | 0.12 |  | 0.43 | 2 | 4 |  |
| 19 | 376 | E | 0.96 |  | 0.37 | 2 |  |  |
| 20 | 364 | F | 0.67 | 0.39 |  | 5.5 |  | 11.2 |
| 21 | 363 | F | 0.57 |  |  | 3.5 |  |  |
| 22 | 360 | G | 0.33 | 0.24 | 0.45 | 3 | 4.5 | 5.8 |
| 23 | 360 | G | 0.32 | 0.20 | 0.42 | 3.0 | 5.0 | 6.5 |
| 24 | 362 | H | 0.20 | 0.20 | 0.48 | 2.5 | 4.5 | 5.8 |
| 25 | 362 | H | 0.04 | 0.27 | 0.28 | 5.0 |  | 7.1 |
| 26 | 376 | H | 0.11 |  | 0.49 | 3.0 | 4.5 |  |
| 27 | 377 | H | 0.21 |  | 0.59 | 3.0 | 5.0 |  |
| 28 | 360 | I | 0.38 | 0.20 | 0.46 | 3.5 | 4.5 | 6.7 |
| 29 | 360 | J | 0.36 | 0.16 | 0.56 | 4.5 |  | 4.8 |

-continued

| Example | Oxidation Temp (°F) | Additive | Additive Conc weight % | IR/C=O (1720 cm-1) A/0.5 mm | Δ log vis / Δ $t^{-}_1$ (hrs$^{-1}$) | ASTM Color Oxidized Intermediate | Aminated Product | % Activity |
|---|---|---|---|---|---|---|---|---|
| 30 | 364 | K | 0.418 | | 0.48 | 7.0 | | |
| 31 | 360 | MgO EDA | 0.067 0.010 | 0.29 | 0.21 | 3.0 | 5.5 | 8.0 |
| 33 | 362 | L | 0.306 | 0.12 | 0.09 | 4.5 | | 3.0 |
| 34 | 358 | M | 0.20 | | 0.46 | 4.5 | 6.0 | |
| 35 | 377 | N | 0.20 | | 0.66 | 3.5 | 7.0 | |

Two different ethylene-propylene-diene terpolymers were oxidized in a stirred open pot with air and nitrogen flow rates at 2300 cc/minute each and at a temperature of 360° F. Terpolymer 1 is a 40 Mooney viscosity polymer while terpolymer 2 is a 70 Mooney viscosity polymer.

| Example | Terpolymer | Additive | Additive Conc weight % | IR/C=O (1720 cm$^{-1}$) A/0.5 mm | Δ log vis / Δ $t^{-}_1$ (hrs$^{-1}$) | ASTM Color Oxidized Intermediate | Aminated Product | % Activity |
|---|---|---|---|---|---|---|---|---|
| 36 | Terpolymer 1 | None | — | 0.30 | 0.16 | 5.0 | 7.5 | 9.7 |
| 37 | " | A | 0.76 | 0.28 | 0.24 | 3.0 | 6 | 11.0 |
| 38 | " | A | 0.18 | 0.31 | 0.22 | 2.5 | 3.5 | 11.8 |
| 39 | " | A | 0.19 | | 0.19 | 3.5 | 7.0 | 14 |
| 40 | " | A | 0.06 | 0.29 | 0.18 | 3.0 | 6.5 | 7.7 |
| 41 | " | E | 0.74 | 0.44 | 0.12 | 3.5 | 5.5 | 12.8 |
| 43 | Terpolymer 2 | None | | | 0.28 | 4.5 | 5.5 | 8.9 |
| 44 | " | I | 0.42 | | 0.38 | 3.5 | 5.5 | 8.7 |
| 45 | " | B | 0.20 | | 0.51 | 2.5 | 3.0 | |

As can be seen, benzene sulfonic acids or salts thereof affect the rate of oxidation reaction and/or the color of the oxidized product. When an oxidized product of light color is aminated, the animated product generally is a light color also.

We claim:

1. The process of oxidizing copolymers of ethylene and olefinically unsaturated monomers in the temperature range of from about −40° F. to about 800° F. in the presence of from about 0.01 weight percent to about 5.0 weight percent based on copolymer/oil solution, of an oil soluble benzene sulfonic acid or salt thereof.

2. The process of claim 1 wherein the oxidation is an air oxidation conducted in the temperature range of from about 100° F. to about 800° F.

3. The process of claim 1 wherein the oxidation is conducted in the presence of about 0.10 to about 1.0 weight percent based on copolymer/oil solution, of an oil soluble benzene sulfonic acid or salt thereof.

4. The process of claim 1 wherein the benzene sulfonic acid or salt thereof has the formula

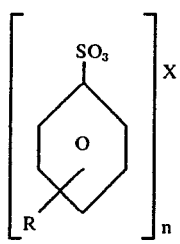

where R is hydrogen, alkyl or hydroxy, chloro or bromo hydrocarbyl, X is hydrogen, magnesium, calcium, sodium, or amine and $n$ is an integer of 1–2.

5. The process of claim 4 wherein R is an alkyl group made by polymerizing $C_2$–$C_6$ olefins and having a molecular weight in the range of about 80 to about 100,000.

6. The process of claim 1 wherein a copolymer of ethylene and propylene is oxidized.

7. The process of claim 1 wherein the copolymer has a number average molecular weight from about 20,000 to about 70,000.

8. The process of claim 2 wherein the air oxidation is conducted in the temperature range of from about 100° F to about 400° F.

9. The process of claim 5 wherein R is an alkyl group having a molecular weight in the range of about 80 to about 1000.

10. The process of claim 1 wherein an ethylene-propylene-diene copolymer is oxidized.

11. A process for making a lubricating oil viscosity improver which comprises first oxidizing copolymers of ethylene and olefinically unsaturated monomers in the temperature range of from about −40° F. to about 800° F. in the presence of from about 0.01 weight percent to about 5.0 weight percent based on copolymer/oil solution, of an oil soluble benzene sulfonic acid or salt thereof and then reacting said oxidized copolymer with primary or secondary amine or polyamine so that a nitrogen containing, viscosity improving material is formed.

12. The process of claim 11 wherein the oxidation is an air oxidation conducted in the temperature range of from about 100° F. to about 800° F.

13. The process of claim 11 wherein the oxidation is conducted in the presence of about 0.10 to about 1.0 weight percent based on copolymer/oil solution, of an oil soluble benzene sulfonic acid or salt thereof.

14. The process of claim 11 wherein the benzene sulfonic acid or salt thereof has the formula

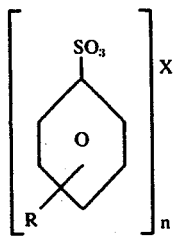

where R is hydrogen, alkyl or hydroxy, chloro or bromo hydrocarbyl, X is hydrogen, magnesium, calcium, sodium, or amine and $n$ is an integer of 1–2.

15. The process of claim 14 wherein R is an alkyl group made by polymerizing $C_2$–$C_6$ olefins and having a molecular weight in the range of about 80 to about 100,000.

16. The process of claim 11 wherein a copolymer of ethylene and propylene is oxidized.

17. The process of claim 11 wherein the copolymer has a number average molecular weight from about 20,000 to about 70,000.

18. The process of claim 12 wherein the air oxidation is conducted in the temperature range of from about 100° F to about 400° F.

19. The process of claim 15 wherein R is an alkyl group having a molecular weight in the range of about 80 to about 1000.

20. The process of claim 11 wherein an ethylene-propylene-diene copolymer is oxidized.

21. The process of claim 11 wherein the oxidized polymer is reacted with formaldehyde and a polyamine.

* * * * *